(12) United States Patent
Beck et al.

(10) Patent No.: US 8,973,122 B2
(45) Date of Patent: Mar. 3, 2015

(54) TOKEN BASED TWO FACTOR AUTHENTICATION AND VIRTUAL PRIVATE NETWORKING SYSTEM FOR NETWORK MANAGEMENT AND SECURITY AND ONLINE THIRD PARTY MULTIPLE NETWORK MANAGEMENT METHOD

(75) Inventors: Justin M. Beck, Mesa, AZ (US); Chad L Swensen, Mesa, AZ (US)

(73) Assignee: Directpointe, Inc., Lindon, UT (US)

( * ) Notice: Subject to any disclaimer, the term of this patent is extended or adjusted under 35 U.S.C. 154(b) by 78 days.

(21) Appl. No.: 13/451,743

(22) Filed: Apr. 20, 2012

(65) Prior Publication Data

US 2013/0104214 A1    Apr. 25, 2013

Related U.S. Application Data

(63) Continuation of application No. 12/699,313, filed on Feb. 3, 2010, now abandoned, which is a continuation of application No. 11/735,579, filed on Apr. 16, 2007, now abandoned, which is a continuation-in-part of (Continued)

(51) Int. Cl.
*G06F 7/04* (2006.01)
*H04L 29/06* (2006.01)
(Continued)

(52) U.S. Cl.
CPC ............ *H04L 63/06* (2013.01); *H04L 63/0869* (2013.01); *H04L 9/3234* (2013.01);
(Continued)

(58) Field of Classification Search
CPC .............. H04L 9/3234; H04L 63/0853; H04L 63/0869; G06F 2221/2153; G06F 21/34

USPC ............ 713/156, 169, 170, 185; 726/5, 9, 29; 380/270; 709/225, 229; 705/55, 67
See application file for complete search history.

(56) References Cited

U.S. PATENT DOCUMENTS 6,549,906 B1    4/2003    Austin et al.
6,611,913 B1    8/2003    Carroll et al.
(Continued)

OTHER PUBLICATIONS

BlueSoleil. "BlueSoleil Software & Bluetooth USB Dongle", IVT, Jun. 2003.
(Continued)

*Primary Examiner* — Michael Simitoski
(74) *Attorney, Agent, or Firm* — Blynn L. Shideler; Krisanne Shideler; BLK Law Group (57) ABSTRACT

A two-factor network authentication system uses "something you know" in the form of a password/Pin and "something you have" in the form of a key token. The password is encrypted in a secure area of the USB device and is protected from brute force attacks. The key token includes authentication credentials. Users cannot authenticate without the key token. Four distinct authentication elements that the must be present. The first element is a global unique identifier that is unique to each key. The second is a private credential generated from the online service provider that is stored in a secure area of the USB device. The third element is a connection profile that is generated from the online service provider. The fourth element is a credential that is securely stored with the online service provider. The first two elements create a unique user identity. The second two elements create mutual authentication.

17 Claims, 3 Drawing Sheets

Related U.S. Application Data application No. 11/071,071, filed on Mar. 3, 2005, now Pat. No. 7,565,529.

(60) Provisional application No. 60/549,959, filed on Mar. 4, 2004.

(51) Int. Cl.

| | | |
|---|---|---|
| *H04L 9/32* | (2006.01) | |
| *G06F 21/34* | (2013.01) | |
| *H04W 12/06* | (2009.01) | |
| *G06F 17/30* | (2006.01) | |
| *H04K 1/00* | (2006.01) | |
| *H04W 84/12* | (2009.01) | |
| *H04W 88/08* | (2009.01) | |

(52) U.S. Cl.
CPC ............ *G06F 21/34* (2013.01); *H04L 63/0272* (2013.01); *H04L 63/0823* (2013.01); *H04L 63/0853* (2013.01); *H04L 63/162* (2013.01); *H04L 2463/082* (2013.01); *H04W 12/06* (2013.01); *H04W 84/12* (2013.01); *H04W 88/08* (2013.01); *H04L 9/3226* (2013.01); *H04L 9/3263* (2013.01); *H04L 9/3273* (2013.01)
USPC ...... 726/9; 726/5; 726/29; 713/156; 713/169; 713/173; 713/185; 709/225; 709/229; 705/67; 705/55; 380/270

(56) References Cited

U.S. PATENT DOCUMENTS

| | | |
|---|---|---|
| 6,658,500 B1 | 12/2003 | Pinault |
| 6,662,221 B1 | 12/2003 | Gonda et al. |
| 6,665,719 B1 | 12/2003 | Isoda |
| 6,671,726 B1 | 12/2003 | Hanway |
| 6,675,196 B1 | 1/2004 | Kronz |
| 6,684,269 B2 | 1/2004 | Wagner |
| 6,687,831 B1 | 2/2004 | Albaugh et al. |
| 7,149,896 B1 | 12/2006 | Bahl et al. |
| 7,158,803 B1 | 1/2007 | Elliott |
| 7,441,108 B2 | 10/2008 | Fisher et al. |
| 2002/0035699 A1 | 3/2002 | Crosbie |
| 2002/0128977 A1 | 9/2002 | Nambiar |
| 2002/0136226 A1 | 9/2002 | Christoffel et al. |
| 2003/0061364 A1 | 3/2003 | Banerjee et al. |
| 2003/0120767 A1 | 6/2003 | Morimoto |
| 2003/0194988 A1 | 10/2003 | Knox |
| 2003/0202497 A1 | 10/2003 | Csapo |
| 2003/0207668 A1 | 11/2003 | McFarland et al. |
| 2004/0022186 A1 | 2/2004 | Kump et al. |
| 2004/0054905 A1 | 3/2004 | Reader |
| 2004/0068653 A1 | 4/2004 | Fascenda |
| 2004/0073672 A1 | 4/2004 | Fascenda |
| 2004/0073797 A1 | 4/2004 | Fascenda |
| 2004/0103317 A1 | 5/2004 | Burns |
| 2004/0106403 A1 | 6/2004 | Mori et al. |
| 2004/0106433 A1 | 6/2004 | Ooki et al. |
| 2004/0125553 A1 | 7/2004 | Castell et al. |
| 2004/0179512 A1 | 9/2004 | Leblanc et al. |
| 2004/0225898 A1 | 11/2004 | Frost et al. |
| 2005/0033968 A1 | 2/2005 | Dupouy et al. |
| 2005/0043999 A1 | 2/2005 | Ji et al. |
| 2005/0050352 A1 | 3/2005 | Narayanaswami et al. |
| 2005/0063333 A1 | 3/2005 | Patron et al. |
| 2005/0074122 A1 | 4/2005 | Fascenda |
| 2005/0086468 A1 | 4/2005 | Meandzija et al. |
| 2005/0091483 A1 | 4/2005 | Fascenda |
| 2005/0102509 A1 | 5/2005 | Fascenda |
| 2005/0109841 A1 | 5/2005 | Ryan et al. |
| 2005/0154887 A1* | 7/2005 | Birk et al. .................... 713/168 |
| 2005/0188194 A1 | 8/2005 | Fascenda |
| 2005/0246531 A1 | 11/2005 | Fabre |
| 2006/0007897 A1 | 1/2006 | Ishii |
| 2006/0168653 A1 | 7/2006 | Contrera |

OTHER PUBLICATIONS

Knorr, Eric. The PC Bible, 1995 Peachpit Press, pp. 53-55.

Foldoc. "Flash Erasable Programmable Read-Only Memeory", 1995, retrieved from http://foldoc.org/index.cgi?Flash+Erasable+Programmable+Read+Only+Memory.

Sean Convery, Darrin Miller, Sri Sandaralingam, Mark Doering, Pej Roshan, Stacey Albert, Bruce McMurdo, Jason Halpern, Cisco SAFE: Wireless LAN Security in Depth, Cisco Systems, Inc.

Marc Loutrel, Pascal Urien, Guy Pujolle, A smartcard for authentication in WLANs.

Mistupid.com The Online Knowledge Magazine, Sieffa Wireless Aircard 510/Sprint PCS, http://mistupid.com/reviews/aircard/ , 2001-2002 miStupid.com.

* cited by examiner

TOKEN BASED TWO FACTOR AUTHENTICATION AND VIRTUAL PRIVATE NETWORKING SYSTEM FOR NETWORK MANAGEMENT AND SECURITY AND ONLINE THIRD PARTY MULTIPLE NETWORK MANAGEMENT METHOD

RELATED APPLICATIONS

The present application is a Continuation of U.S. patent application Ser. No. 12/699,313 filed Feb. 3, 2010 and published Jul. 29, 2010 as publication Number 2010-0191960. U.S. patent application Ser. No. 12/699,313 is a Continuation of U.S. patent application Ser. No. 11/735,579, filed Apr. 16, 2007 and which published on Aug. 9, 2007 as U.S. Patent Publication Number 2007-0186099. U.S. patent application Ser. No. 11/735,579 is a Continuation-in-Part of U.S. patent application Ser. No. 11/071,071, filed Mar. 3, 2005, now U.S. Pat. No. 7,565,529 which issued Jul. 21, 2009. U.S. patent application Ser. No. 11/071,071 published on Apr. 6, 2006 bearing publication number 2006-0072527. U.S. patent application Ser. No. 11/071,071 and related international application serial number PCT/US05/06927, which published as publication number WO 2005-00725527 claim the benefit of U.S. Provisional Patent Application Ser. No. 60/549,959 entitled "SECURE AUTHENTICATION AND NETWORK MANAGEMENT SYSTEM FOR WIRELESS LAN APPLICATIONS" filed Mar. 4, 2004. The above identified patent 7,565,529 and publication numbers 2010-0191960, 2007-0186099, 2006-0072527 and WO 2005/89120 are incorporated herein by reference in their entirety.

BACKGROUND OF THE INVENTION

1. Field of the Invention

The present invention relates to a user authentication system for network security and management, and more particularly, to a token based two factor authentication and virtual private networking system for third party network management and security of online networks.

2. Background Information

Any network, including Wi-Fi networks, will need to control what computer resources specific users have access to and will generally need to keep track of the activity of users over the network. Authentication is the process of identifying an individual, usually relying upon on a username and password. Authentication is based on the idea that each individual user will have unique information that sets him or her apart from other users. Authorization is the process of granting or denying a user access to network resources once the user has been authenticated, such as through the username and password. The amount of information and the amount of services the user has access to depend on the user's authorization level. Finally, accounting is the process of keeping track of a user's activity while accessing the network resources, including the amount of time spent in the network, the services accessed while there and the amount of data transferred during the session. Accounting data is used for trend analysis, capacity planning, billing, auditing and cost allocation. In computer technology, an "identity' is the unique name of a person, device, or the combination of both that is recognized by a system. Many types of network management systems rely on unique identities to ensure the security of the network and its resources.

There are three universally recognized factors for authenticating individuals: (1) "Something you know", such as a password or personal identification number (PIN); (2) "Something you have", such as a mobile phone, a Automatic Teller Machine (ATM) Card, or hardware security token; and (3) "Something you are", such as a fingerprint, a retinal scan or other biometric.

A system uses "two factor authentication", also called T-FA or dual factor authentication, when it requires at least two of the authentication form factors mentioned above. This contrasts with traditional password authentication, which requires only one authentication factor (such as knowledge of a password) in order to gain access to a system. Common implementations of two-factor authentication use 'something you know' (a password) as one of the two factors, and use either 'something you have' (a physical device) or 'something you are' (a biometric such as a fingerprint) as the other factor. A common example of T-FA is an ATM card wherein the card itself is the physical "something you have" item, and the personal identification number (PIN) is the "something you know" password that goes with it.

Using more than one factor is also called strong authentication; using just one factor, for example just a static password, is considered by some to be weak authentication.

Establishing and protecting identity is an increasing challenge and burden to both consumers and suppliers of goods or services. While identity verification and protection is a widespread issue for all networks, the identity challenges on the Internet are most prominent as "online identity" (meaning identity over the internet) is inherently problematic. "Online" will be used herein to generally reference internet applications. There is a growing demand for solutions to address its challenges.

Effective improvements in online identity require an increase in security. New security technology must address today's online identity threats. However, higher security alone is not a complete solution. The security technology must be easy to use or, preferably, essentially transparent to the end user in order to achieve adoption and success. Security solutions that are not accepted by users and used are ineffective. It is an object of the present invention to improve online identity exchange by simultaneously increasing security and simplicity for both end users and system administrators.

The burden of identity is more than just preventing user identity theft. It is more inclusive of challenges to an entire online ecosystem that spans users and providers across all industries and user groups. The online space is very dynamic and growing at a fast pace. Identity standards have not kept pace with changing needs and threats, which is putting online commerce and communication at risk to increasing vulnerability. The need for better standards and techniques is reaching a critical level. This problem will only grow worse as the Internet is increasingly used as the delivery platform for media content and services.

The Internet is fast becoming the standard communication protocol for voice, video, music, instant message, email and reference information including news, search, blogging, personal websites and picture sharing. Changes in software are shifting to software as a service (SaaS) where applications and data are stored on servers and accessed via the Internet instead of installed on the computer. This trend is pushed by companies like Google, Sun and Microsoft.

Ecommerce is more than just shopping online. It includes bill payment, banking, stock trading, and money transfers. A majority of these growing services require some form of user authentication. Authentication—proving you are who you say you are as discussed above—allows users and providers to protect or personalize online services and information. Online Service Providers also must prove their identity to their growing number of users to prevent against phishing and spoofing attacks. Thus, authentication is a mutual concern. As the number and extent of online services continue to expand, the need for online authentication and the frequency of its use will also multiply.

The common form of user authentication today, usernames and passwords, is weak and cumbersome (weak authentication as noted above). The username and password was an early internal corporate standard that was never intended for an open online ecosystem. The security weakness of usernames and passwords is well documented and as Microsoft's Bill Gates describes the situation, "Today, we're using password systems, and password systems simply won't cut it; in fact, they're very quickly becoming the weak link". Because username and password systems have varying rules and standards, users must also use and remember a variety of usernames and passwords. With online services proliferating, the burden of remembering which combination was used for each application becomes problematic.

Regulatory agencies, standards bodies and popular demand are driving changes in online authentication to eliminate security weakness and user difficulty. In October 2005, the Federal Financial Institutions Examination Council (FFIEC), declared two-factor authentication the standard for online banks by the end of 2006 in order to combat identity theft, which rose to $14.8 Billion in reported losses from April 1994 to May 2005. Infoweek reports that the number one weapon against future malware war is "strong authentication" as defined above. Agencies and regulations in other industries are also driving businesses and individuals to adopt the use of strong authentication, including HIPAA in health care, Sarbanes-Oxley in public corporations, and FIPS 140 standards in the federal government.

From an end user standpoint, there is growing frustration with the increasing threat of exposure of their personal data and finances and the increasing variety of systems they must interact with to protect themselves. Online service providers also need solutions which keep their applications safe and will drive users to their services without increasing the burden of identity. All parties are calling for a simple and effective solution to secure authentication.

As further background information virtual private network, or VPN, is a network that is constructed by using public connections (e.g. wires or wireless couplings) to connect devices of a network. A VPN provides a system for securing transmissions across TCP/IP networks. A VPN is a secure "tunnel" between two points on the network, through which all traffic is encrypted and secure. For example, VPN software running on a laptop computer can establish a secure connection from the laptop, across the Internet to a VPN server behind a corporate firewall thousands of miles away. Such systems use encryption and other mechanisms (e.g. passwords) to try and ensure that only authorized users can access the network and that the data cannot be intercepted.

The right solution to the identity crisis, particularly online, must be comprehensive in its scope and simple in its operation in order to be effective. Some enterprise organizations have implemented strong authentication, including two-factor authentication utilizing Virtual Private Network (VPN) solutions, but these solutions were complex and produce end-user confusion and frustration. These enterprise solutions have been built for the enterprise environment, where the technical support desk is, in theory, waiting on hand. Employees have tolerated difficult authentication solutions because they have few options. Expensive enterprise in-house network authentication solutions requiring complicated installation and user inconvenience cannot simply be thrown over the wall to consumers and expect acceptance. The winning solution must be able to meet higher security standards and break down the barriers of complexity, implementation costs and adoption risks.

SUMMARY OF THE INVENTION

One embodiment of the present invention provides a network management device for a plurality of local networks coupled through a connecting medium or connecting network, such as the internet. A plurality of end user devices, such as laptops, are attachable to the connecting network forming nodes thereof, and each end user device has input plugs, such as USB ports and the like, for coupling accessories thereto. An authentication device is provided in/on the connecting network, such as being coupled to the internet, for authenticating the end user devices attachable to the connecting network for selected local networks. A plurality of physical authenticating keys is provided, with each key attachable to an input plug of an end user device. Each key contains a validation certificate therein, wherein the authentication device verifies the presence of a current validation certificate on a key coupled to the end users device prior to granting access to the specified local networks.

In one embodiment of the present invention, each key establishes a virtual private network tunnel between the key and the authentication device for the authentication process. Further, each key is generally the size of a conventional key for a mechanical lock (e.g. a house key or a car key) and is on the order of 1" to 5". Each key may include indicia thereon indicative of the source of the key such as the Wi-Fi wireless local area network operator. Each key may attach to a universal serial bus port of the end user device. Each key may include separate functionality, such as forming a USB port flash drive.

A management device preferably maintains an active directory of valid certificates of the keys and will communicate this list to the authentication device. The network management device may be coupled to the authentication device through the internet allowing for third party management of the system.

Another function of the physical, plug in authenticating key is the incorporation of a personal profile on an individual's key. The inclusion of a personal profile on the key allows the key to grant privileges, i.e. differentiated network access, on the network associated with the particular user to whom the key is assigned, referred to as profile management. There will likely be different personal profiles associated with a single key used for a plurality of local networks. This system also works particularly well in multi-computer environment. Further, this system supplements the profile management tool of a PIN/password now commonly used for differentiating levels of access between users of a network. Further, the PIN/password management may be incorporated onto additional software on the key itself.

A further possible additional function of the physical, plug in authenticating key is the incorporation of separate functionality such as network protection software, e.g. anti-virus, anti-spam, and anti-spyware software, on an individual's key. The key may simply check the user's computer to see if the required software, and updates, are present and then, if the user is not current (up to date with the most recent protection software), the management platform could quarantine the users device and force the updates onto the user's computer, essentially without the need for user intervention. The updated software may come directly from the key, or the key may be used only to verify the presence of the required software and the management platform actually send the updates to the subject machine. Either implementation results in a self-healing network. Almost any software application may be incorporated onto the key allowing the key to have separate functionality, such as a USB port flash drive. The present invention provides an efficient and effective tool for protecting the integrity and the health of a given network, and series of networks.

These and other advantages of the present invention will be clarified in the description of the preferred embodiments taken together with the attached drawings in which like reference numerals represent like elements throughout.

DESCRIPTION OF THE PREFERRED EMBODIMENTS

Figure 1:
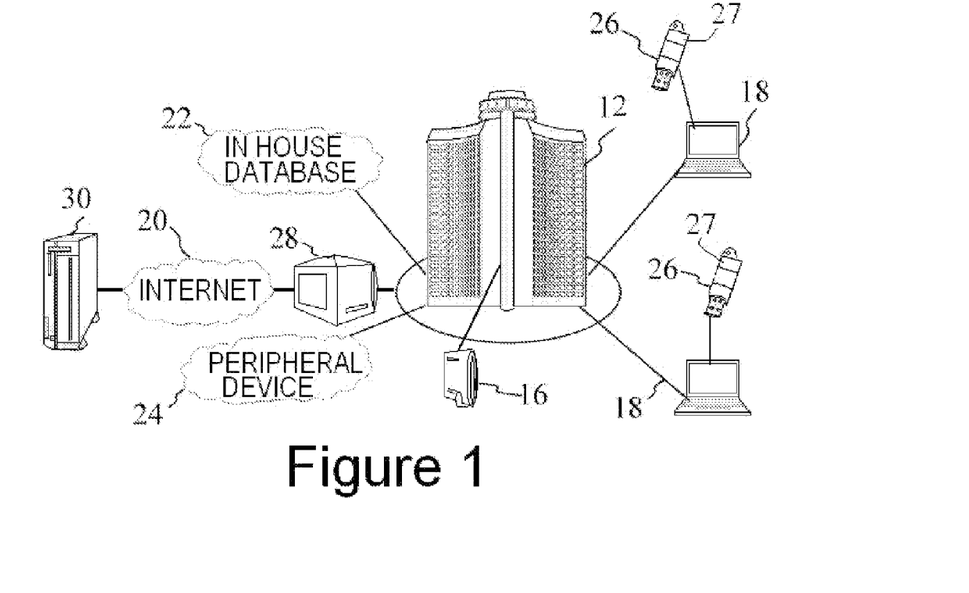
FIG. 1 is a schematic view of a Wi-Fi WLAN having an token based two factor authentication and virtual private networking system according to the present invention.
Figure 2:
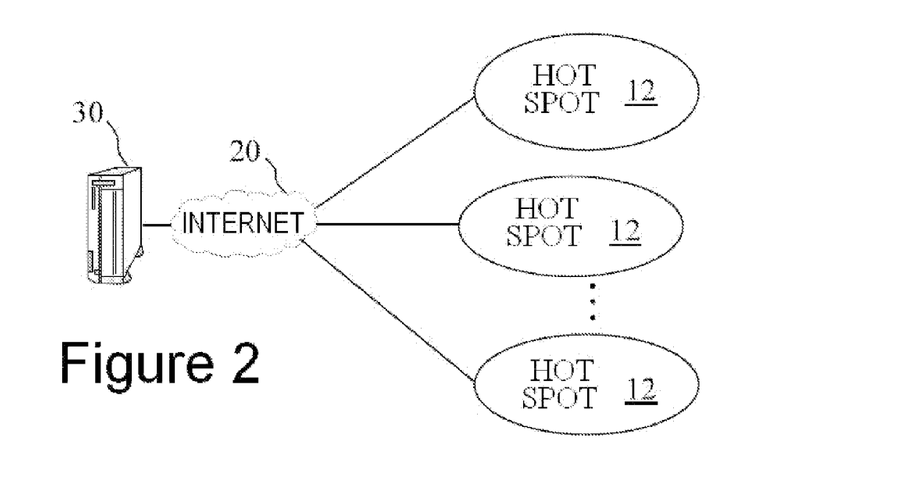
FIG. 2 is a schematic view of the network management system according to the present invention applied to a collection of Wi-Fi hot spots.

The present invention was developed and is based on the principle of simple security. The present invention provides products that effectively address the barriers and risks of adopting strong authentication and provide relief from the burden of identity for both users and providers. As described below the present invention provides a token-based two-factor authentication and virtual private networking (VPN) approach that simultaneously increases security and increases simplicity. The present invention is useful for management of effectively any network, and as described further below, a single user key may be implemented as a authenticating token for separate networks associated with the user. One non-limiting example of the invention is associated with authentication and network management of Wi-Fi networks 10, such as shown in FIGS. 1-2. This description is helpful for explaining the present invention, but the invention is not intended to be limited to Wi-Fi networks and is useful with any network.

A Wi-Fi network 10 is schematically illustrated in FIGS. 1-2. The network 10 provides end-to-end solution to address hardware, security, and authentication as well as network management aspects of Wi-Fi deployment in accordance with the present invention. The network 10 can be used in all WLAN applications, including private wireless networks and both Free Amenity and Connect Fee Hot Spot business models. The present invention is described in connection with a wireless network such as Wi-Fi network 10, and is particularly well suited for such wireless networks, however the functionality of the present invention is applicable to wired networks, and combination wired/wireless networks as noted. These advantages should be apparent from the description of the preferred embodiment.

The network 10 includes a plurality of hot spots 12 as shown in FIG. 2. Each hot spot 12 may be in a single building 14 (e.g. a hotel, café or the like), or throughout a collection of buildings (e.g. an office park), or over a given area (e.g. a park setting) as known in the art. Each hot spot 12 includes at least one access point device 16 for the hot spot 12. Each access point device 16 according to the present invention, preferably, combines an 802.11 standard (b/g, a or even the 802.16 standard or eventually the 802.11i standard) radio together with a signal booster amplifier into a single device. Integrating the signal booster amplifier and the Wi-Fi radio into one device, the access point device 16 can provide a larger RF signal footprint than conventional access points. Where the hot spot 12 is covering large facilities (e.g. a college campus or collection of buildings for a business), the hot spot 12 may use multiple access point devices 16 to provide wireless signal throughout the entire facility (i.e. over the entire hot spot 12).

As with conventional Wi-Fi networks, the network 10 is intended to provide users with the ability to access the network 10 with end user devices such as laptops 18 or other designated end user Wi-Fi capable devices (e.g. PDAs or any device with Wi-Fi capabilities). For reference purposes, a PDA, or personal digital assistant, is a common handheld device that combines computing, telephone/fax, Internet and networking features; and a laptop is a small, portable computer which is frequently called a notebook computer. Regarding the network 10, the access may provide the users with high speed access to the internet 20, which is one common business model. Alternatively the purpose of the hot spot 12 of the network 10 may be primarily to grant access to a confidential in house database 22, such as in a hospital or in a research library. Alternatively, a significant purpose of an individual hot spot 12 may be to grant access to specialized equipment 24, such as a color printer. Combinations of these purposes are also common. The intended purpose and primary functions of the hot spots 12 or of the overall network 10 are essentially limitless.

The key features of the network 10 are the authentication and network management devices that are employed. An authenticating device or key 26 is associated with each end user device or node (laptop 18 or other Wi-Fi device) of the network 10. The authenticating device or key 26 is a fully portable USB plug-in authentication device the size of an average house key forming a "what you have" part of two factor authentication. The end user devices, such as laptop 18, will include standard input plugs, such as USB ports and the like. "USB" refers to Universal Serial Bus, and is an external bus standard that supports data transfer rates of 12 Mbps. A single USB port can be used to connect peripheral devices, such as mice, modems and keyboards. Each key 26 will plug into a USB port of any end user device, such as laptop 18, to be connected to the hot spot 12.

Each key 26 carries a unique electronic validation certificate that authorizes network access and the key 26 easily plugs into the USB port of any device. The authentication device or key 26 within the meaning of the present invention is a physical token which is connectable, e.g. a plug in connection, to a standard input device, e.g. USB port, of an end user device, e.g. laptop 18. The key 26 may, alternatively, use a variety of standard device inputs, including a disc drive, but the USB port has the advantage of being in-obtrusive to the end user, i.e. not tying up a critical input device of the end user's device.

It should be apparent that the physical shape of the key 26 can vary greatly without altering the authenticating function of the key 26. The size of the key 26, about 1"-5" in length, is an important feature of the present invention. Larger size keys 26 would be become unwieldy to the users. The size of the key 26 is easy to carry by the users and it is indicative to the user of the function of the key (i.e. it is sized similar to keys for mechanical locks with which users will be familiar). The size of the key allows for branding of the key by both the venue and the network manager, as evidenced by logo 27 in FIG. 1. The "branding" 27 also allows instructions, if desired, to be conveyed to the user, e.g. "Plug into USB port of device", or "For assistance contact . . . " The branding 27 is believed to be particularly helpful for commercial public networks, e.g. a café or hotel, where the end user keeps the key 26 and is easily reminded of this easy access amenity.

It is critical to understand that the security of the system is not compromised by the user maintaining the key 26 after network access should end, as the certificate can be easily "turned off" as needed as identified below.

The key 26 may include separate functionality, such as forming a USB Port flash drive, also called a memory stick, whereby the authentication function becomes more unobtrusive and transparent to the end users. From the user's perspective the authentication functions of the key 26 may be primarily supplemental to such separate functionality, whereby the distribution of the key 26 to the users is driven by such separate functionality. In other words, for example, users purchase a particular USB Port Flash drive for the flash drive capabilities and the authentication functionality is added therein and is associated with particular networks that support/require such functionality. From a distribution standpoint the networks need not be a sole supplier or even a primary supplier of the key, they can merely identify to potential user's that network access requires a certain brand and model of flash drive that has the authentication functionality, with, possibly, the networks supplying such keys as a back up to users that do not otherwise have access to the specified model and make of flash drive.

The network 10 provides a turn-key security and authentication solution to the hot spot 12 by having a Hot Spot authentication device 28 at each Hot Spot location. The authentication device 28 is a "plug and play" device (as are the keys 26) to provide easy hot spot 12 administrations. The term "plug and play" references the ability of a computer system to automatically configure and operate software or an attached device (i.e. the operator need not set DIP switches, jumpers or other configuration elements). The authentication device 28 will be provided with an updatable list of valid certificates associates with valid keys 26. With a key 26 in the USB port of an end user Wi-Fi device, a secure VPN tunnel is created between the authentication device 28 and the node end user device with the key 26. This system does not replace existing systems desired to be utilized by the HSO, such as passwords and WEP type encryption, but works in conjunction therewith. The password component of network security forms the second authentication factor for two factor authentication, forming a "what you know" component. Further, the password management software may be provided on the key 26, if desired.

The final portion of the authentication and network management solution is the provision of a network management device 30 which is coupled to each hot spot 12 through any connection, such as preferably, the internet 20. The management device 30 will manage certificates of the keys 26 for multiple hot spots 12. The management device 30 maintains an active directory of valid certificates and will communicate this list to the authentication device 28 of the specific hot spot 12. It should be apparent that keys 26 will be added and eliminated from the various hot spots 12 in the ordinary course of operation. New keys 26, with new certificates embedded therein, will be added for replacement of old keys and for expansion. Old keys 26 will be lost, not returned to the HSO, or damaged and therefore dropped from the list of valid certificates. The network management device 30 will also receive network outage alarms and other information needed for network management and administration. However the authentication and the accounting aspects of the specific hot spots 12 may be effectively accomplished at the hot spot 12 (other than the updating of the lists for valid certificates).

The network 10 secures wireless data transmission in a simple solution meeting HIPAA, FIPS and corporate security standards. A significant advantage of the network 10 is the ability to overcome WEP weaknesses that hinders widespread Wi-Fi deployment, particularly in corporate networks. The network 10 secures wireless data in the hot spot 12 with a "local VPN" between the authentication device 28 and the key 26 that will be on the device 18 of the end client. Even if the WEP security element is compromised in a hot spot 12 of the network 10, the data itself is encrypted in a VPN tunnel. Thus, there is no visibility to data in a wireless transfer. Hacking the network key is further frustrated with the authentication standards of the network.

The network 10 delivers a cost effective solution that enhances the customer experience at the specific hot spots 12 while maintaining a fail safe authentication system. All network features for the Wi-Fi implementation (Internet access, corporate data or applications) are located behind the local authentication device 28 allowing the network to be applicable to any hot spot business model. Without the proper certificate in the key 26 located on the end client (in laptop 18), access to the network 10 is denied. This eliminates the threat from bandwidth hacking, rogue access points and other access breaches that are very common with alternative wireless authentication systems on the market today.

For a public hot spot 12, the customer experience is dramatically enhanced with no need for online billing or entering credit cards each time the network is accessed (although the HSO may elect to utilize similar billing arrangements at his option). Billing of the end users, if any, occurs through the venue. The only step outside of "plug and play" from the user perspective is to install the system driver the first time it is used. The driver is downloaded from the static splash page stored on the local authentication device 28. The centralized network management function of the solution is also simple since authentication takes place at the hot spot 12. There is no need for large data centers or billing applications to run at the aggregator's location. This reduces costs and operations complexity for the network administration and allows the network 10 to service a large variety of hot spots 12. In other words, the network 10 does not require network management costs that are only applicable for certain hot spot types to be distributed over all of the hot spots 12. Network management is limited to maintaining a database of valid certificates and monitoring equipment to ensure proper operation.

The network 10 provides industrial grade broadband wireless infrastructure solutions, including products and services that enable a cost-effective build-out and management of private and public access wireless networks (Hot Spots 12). The network 10 offers a Wi-Fi solution to both private and public network (hot spot 12) operators by providing a unique resolution to security and authentication issues that hinder Wi-Fi deployment.

The authenticating key 26 may further, preferably, incorporate a personal profile associated with the user to which it is granted, particularly where there are levels of access to the network 10. The inclusion of a personal profile on the key 26 allows the key 26 to grant various sets of access, also called network privileges, on the network 10. These privileges would be associated with the particular user to whom the key 26 is assigned, and this is also referred to as profile management. This profile management application works particularly well in multi-computer environment in which different users are granted different levels of access, e.g. managerial level access, administrator access, etc. Further, this profile management aspect of the present invention supplements the profile management tool of a PIN/password now commonly used for differentiating levels of access between users of a network 10.

The authenticating keys 26 may further incorporate network protection software, e.g. anti-virus, anti-spam, and anti-spyware software. The key 26 may simply check the user's computer, or other connected device, to see if the required software, and updates are present on the device. If the associated device is not current with the required level of protection software, e.g. the latest anti-virus update, the management platform could quarantine the particular device from the network access and force the updates onto the user's computer, or other device. This could be accomplished at log-in, essentially without the need for user intervention. The updated software may come directly from the key 26, or the key 26 may be used only to verify the presence of the required software and the management platform actually send the updates to the subject machine. Either implementation results in a self-healing network. The present invention provides an efficient and effective tool for protecting the integrity and the health of a given network.

Almost any software application may be incorporated onto the key 26, whereby the key may have separate functionality. For example the key may be a USB flash drive, whereby the users can utilize the key 26 outside the identified network for such separate functionality and use the authentication and management aspects only with selected networks.

The Wi-Fi network 10 may be better explained with a few representative examples. Initially, consider the implementation of a hot spot 12 as an amenity of a hotel. Guests of the hotel are given (or may purchase) the network access with their stay and assigned a key 26. The purchase of the key 26 may be driven by the separate functionality of the key itself, e.g. "A hotel USB flash drive will also allow the user access to the hotel's Wi-Fi network." The user may use his device, e.g. laptop 18, and/or the hotel may have devices available such as computers in a business center. The key 26 will essentially remain valid for the length of their stay. The profile management allows for certain keys 26 of selected guests to be granted additional access to the network, such as access to a color printer or large screen monitors in a business center (which one would assume would be for an additional fee or reserved for "preferred customers"). The inexpensive nature of the keys themselves and the fact that the certification of the key will or can be made to expire, the failure to return a key 26 (where keys 26 are not "purchased" and owned, such as for separate functionality after the user's stay) is not detrimental to the integrity of the system. Further, the "branding" 27 of the key 26 actually suggests the hotel operator will encourage the user to keep the key 26 as a reminder of this particular hotel and this amenity, with the specific certification of a particular key 26 being able to be "reactivated" if the user actually does return for a subsequent stay and returns with the key 26 (of course, a new key 26 can also be easily issued). Additionally, the key 26 can be used to assure that the minimum level of network protection software is provided on the user's specific device as described above. This gives greater flexibility to the network protection software that may be implemented as it allows the minimum level of security to be pushed down to the end user device level as desired.

A separate example would be a university environment, where the network must accommodate students, administration, faculty and staff requirements that vary greatly. In most university environments the pool of students changes every semester. The use of the present system with individual keys 26 allows a very easy method of keeping track of the changing student population with regard to network access. Again the system is not detrimentally affected if the keys 26 are not returned, and they may be a required purchase for the students that desire network access (which seems almost universal in today's environment). Further, this environment highlights the use of the profile management implementation in the keys 26. A faculty member or graduate student in the engineering college may likely have greater access to certain in-house libraries and network resources than does an undergraduate in the humanities college (who may have separate unique accesses as well). Enrolling in particular courses will likely change the profile and the access granted. The university and the hotel example represent situations where the end users are likely to have their own devices, e.g. laptops, as opposed to a business (or even the administration side of the university) which will also provide, and therefore control, the end user devices on the network.

A further example would be in an internal business environment, in which the system allows for easy secure adoption of a wireless network. The profile management items in the present invention would also be particularly useful in such applications, as varied levels of network access are common in business applications, e.g. managerial level access, departmental access (i.e. engineering has different resources on the network than does shipping). It should be noted, again, that the functionality of the present invention remains if it is used in conjunction or exclusively with a wired network, although the advantages of a wireless network are obviously forfeited. The keys 26 may be effectively used in a conventional wired multi-computer network.

Figure 4:
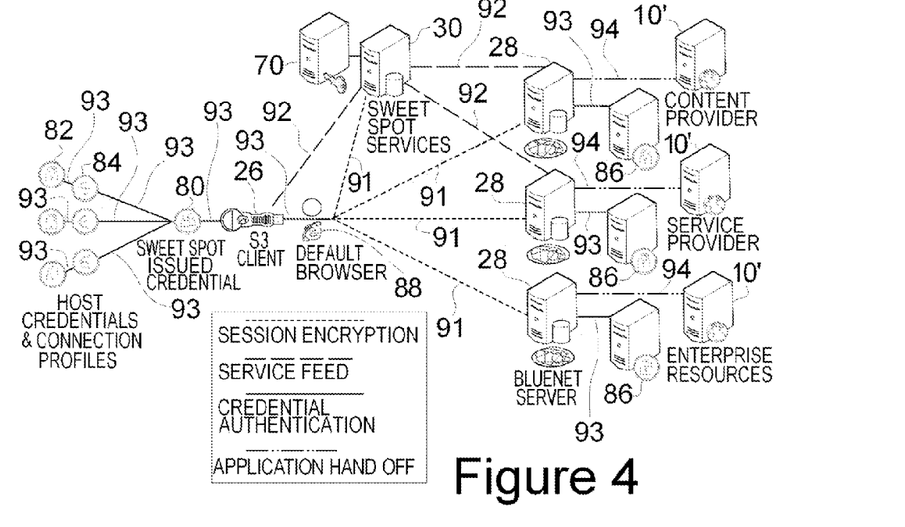
FIG. 4 is a schematic view of an online third party administered token based two factor authentication and virtual private networking system in accordance with the present invention.

The present invention is easily implemented in all online (internet) applications. As shown in FIG. 4, a single key 26 may be used as an authenticating token for a plurality of networks 10' (also referenced as local networks, and service providers) with a single source third party administrator 70 for administration (via network managing device 30) of this authentication methodology. FIG. 4 schematically illustrates the implementation including schematic representation of session encryption coupling 91, services feed coupling 92, credential authentication coupling 93 and application hand-off coupling 94 as described below. The networks 10' can represent online banking systems, SaaS models, or other online accessible networks. Conventional passwords for each system provide the second authentication factor, and management software for the passwords could be implemented on the key 26. The assignee's S3 and Bluenet products provide the technical platform for authentication system shown in FIG. 4. The S3 brand product is the software application that is downloaded or embedded on a USB flash drive forming the key 26. The Bluenet brand product is a server side appliance or software application that interacts with the S3 client. Together, the products provide a single key solution for two-factor authentication, password management, secure transmission of encrypted data in accordance with the present invention.

Figure 3:
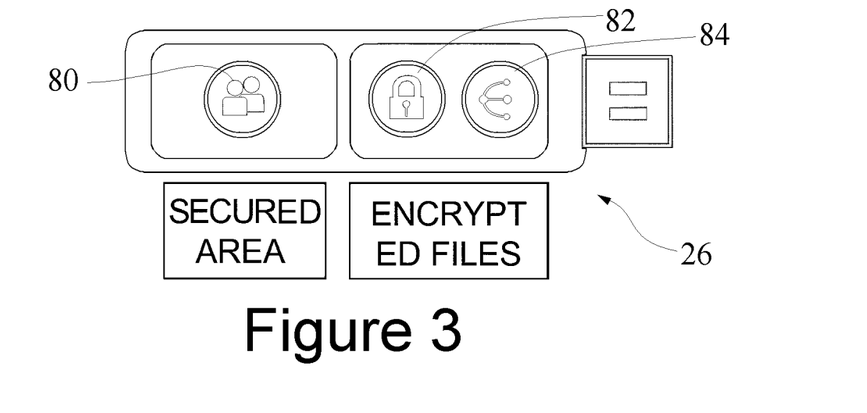
FIG. 3 is a schematic view of a token key configuration in accordance with one aspect of the present invention.

FIG. 3 illustrates the authentication credentials on the key 26 forming the authentication certificate and profile for the individual user that is associated with each network 10 or 10'. The first element is a global identifier 80 that may be stored in a secured area of the USB device or key 26. The first element provides the identity of the user and is effectively a certificate with the user's common information or attributes (e.g. name, e-mail address, etc). The amount of specific user information that is found in and that makes up the global identifier may vary between specific implementations of the invention, but it is important that this information be sufficient to create a global identifier that is unique to the particular user. The global identifier may be created by a third party separate from the network host or the network service provider.

The second component 82 is an encrypted private credential generated by the particular network, i.e. the specific online service provider. These two components combine to form a unique identifier for each user key 26 for each network 10'. A third element 84 on the key 26 is a connection profile provided from the network such as the on-line service provider. These three components 80, 82 and 84 combine to form the "something you have" portion of authentication in the present invention and can be referred to as user network profiles. It should be apparent that each key 26 can have multiple unique identifiers for a user each associated with a specific network 10', and these unique identifiers can share a common global identifier 80 for the user, but differing second and/or third components 82 and 84. The unique identifiers on the key 26

When the user initially creates an identity with the network host or host service provider, the host requests certain information from the first element or the certificate. Some information needed by the host will be required, additional information may be requested (optional). Some of the information needed by the host may need to be inputted by the user (e.g. existing account numbers that are specific to the host and not part of the first element). The user can, for example, check boxes in a dialog box to authorize the submission of desired information, and then the user can submit the requested, authorized information. The host then generates the private credential forming the second component 82 and the connection profile that forms the third element. The second and third elements 82 and 84 are stored on the key 26 and are associated with the user and their privileges with this particular host.

Figure 5:
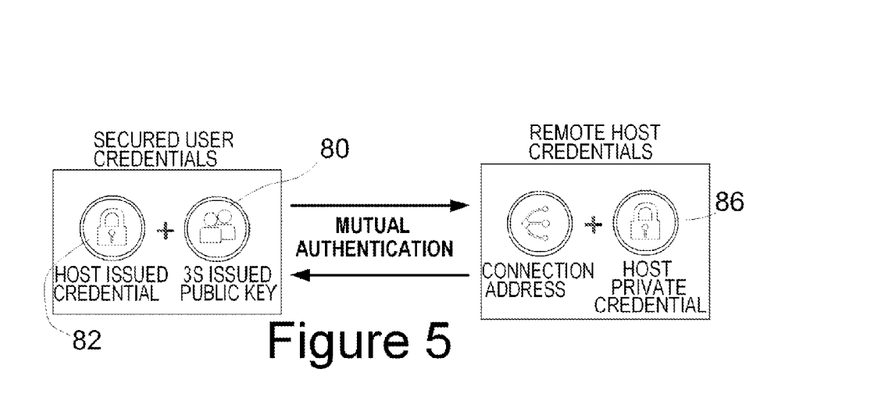
FIG. 5 is a schematic illustration of the mutual authentication for specific networks with the token key in accordance with one aspect of the present invention.

The key 26, with the third element 84, co-operates with a fourth component 86 stored on the network which is a private credential for the network host. The third and fourth components combine to form a mutual or two way authentication for the system which is represented schematically in FIG. 5.

In operation, with the key 26 on the user's device 18 the user need only access the desired network 10' via the connecting medium or network such as the internet through use of an internet browser 88. Following connection to the desired network 10' the user need only click on the specific user network profile associated with that network. This click will allow for one factor "something you have" authentication. The interaction with the networks own component 86 will allow for mutual authentication with this step.

The user network profiles will be, preferably, integrated with a password or pin (Something you know) to add a second factor authentication to the system. Alternatively, as many networks already use a password authentication, the key 26 with the user network profiles can be viewed as adding, or being, the second authentication factor. When the user clicks the designated user network profile the password or pin prompt will appear, however the password requirement may be in different locations (i.e. before the clicking of the user network profile, simultaneous with the selection of the user network profile or after the selection of the user network profile.

In reviewing the advantages of the present invention consider the following IDC report stating: "Consumers themselves represent the greatest potential growth factor for this [two-factor authentication] market. If consumers are presented with Web authentication solutions that focus on the convenience of storing all of the Web access accounts that they must routinely access, IDC believes that consumers may be more open to the use of tokens for this purpose." The philosophy behind the present invention and products resulting there from described above fit perfectly with these IDC predictions and suggestions.

The present invention goes beyond the need for security and identity management and offer consumers an easier way to cope with the overwhelming and ever increasing number of systems and accounts they must access on a regular basis. It is believed that for the consumer market, the Web authentication capability is likely to be widely adopted if included with a USB flash memory token to be successful. A successful solution has to be simple to understand and simple to use. A USB "key" based solution is intuitive. Users understand that a physical key unlocks something valuable—a concept used for their car, their home, etc. Users understand they need a key to gain access to an asset. Customers will like the USB memory stick key 26 because they can understand the concept behind it.

Consider that bankers love the low-cost online banking service model. Implementing a difficult or complex solution that drives customers away from online banking bears a tremendous risk for the bank. The same is true for other businesses—many of which use exclusively online channels. The other factors of simplicity and implementation costs contribute heavily to reducing this barrier as well. Designing strong authentication and secure, encrypted communication is one task, but masking the complexity to end users may be considered an even greater challenge that is addressed by the present invention. Further, by using a shared platform model (single key for multiple networks) which can authenticate users with many providers as shown in FIG. 4, the present invention is able to meet the necessary price points and effectively remove the implementation cost barrier.

Another advantage of the present invention is the adoption risk that is mitigated for the online service providers. The present invention, using the third party management model in FIG. 4 keeps online service providers out of the business of managing keys (or even primarily distributing such keys) and allows them to focus on their core business. By eliminating the barriers of higher authentication, online service providers can support higher authentication standards without additional burden to their organizations.

Another advantage of the multi-network authentication system is that it creates a single key-multiple network solution without sharing a single credential among the networks. No credentials are shared or federated among different organizations of the different networks. This is an important security feature for the service providers who do not want to accept a credential generated by another party. Likewise, the service provider is not required to share their credentials with other parties. This increases the security over other solutions that are required to agree to accept and share credentials in a members-only network.

As noted above the present invention provides a two-factor authentication—something you know and something you have—which is a central feature of the solution. For something you know, the invention requires the use of a password and or pin. This password may be a single 4-16 character password that the user creates. The password is encrypted in a secure area of the USB device and is protected from brute force attacks. For something you have, the invention requires the key's credentials. Users cannot authenticate without the key 26. As noted above, there are four distinct authentication elements that must be present for each associated network. The first element 80 is a global unique identifier that is unique to each key 26/user and hence common between the networks. The second 82 is a private credential generated from the online service provider that is stored in a secure area of the USB device and unique to a given network. The third element 84 is a connection profile that is generated from the online service provider and unique thereto and stored on the key 26. The fourth element 86 is a credential profile for the host that is securely stored with the online service provider and unique thereto. The first two elements effectively create a unique user identity for each network. The second two elements effectively create mutual authentication for each network-user connection.

The key 26 may preferably have a built in password management function which can also accommodate those service providers that are not yet compatible with two-factor authentication. This feature can, if acceptable to the specific service provider, completely eliminate the burden of identity for the user. The password management function can securely stores the username and password of each service provider and automatically generates the credentials for each login, assuming such is acceptable to the specified service provider. It is much more secure to use this function on the key 26 than to use password managers in the browser. The two-factor password function on the key protects the credentials and does not store them on the computer or browser for other users to obtain. This provides a user friendly, service provider controlled solution that is customizable to the particular service provider, while maintaining a common platform.

In addition to authentication services, as described above the key 26 automatically encrypts the data in a secure tunnel established between the user and the service provider. This secure tunnel is generated from the client side based on the protocols set by each service provider. The service provider may choose the type and level of encryption used. The encryption tunneling protects users in wireless environments and from other Internet based attacks.

In the third party operated implementations, the third party administrator 70 may provide services to users to enhance product functionality and simplify identity management. The third party administrator can support lost key, change key, link key, password reset and key data backup features. The third party administrator never needs to have access to user or service provider credentials while providing these services. The administrator simply reduces the burden of identity by facilitating a relationship between the user and the service provider.

If a key is lost, stolen or user does not have immediate access to a USB port, a temporary solution can be provided subject to the service provider protocols. For example, a one-time username/password can be obtained by the user from the third party administrator 70 (subject to the subject network protocols/approval, e.g. with permission of a company's IT department), and then the user can sign on creating a tunnel to the desired network using the password. This solution is a temporary bypass of the two-factor authentication that is critical for normal operation and thus this may not be acceptable to all service providers (i.e. all individual networks). It is only mentioned to demonstrate the flexibility of the system. Whether or not a temporary bypassing password is allowed, the third party administrator 70 or the individual service provider can facilitate getting a replacement key 26 to the user.

In order to illustrate further flexibility of the system, the present invention can operate as with single sign-on with the approval of the independent network (i.e. service provider). Single sign-on is performed after the VPN tunnel is created via the key 26. Single sign-on configuration can be setup by the service providers network administering device (e.g. via a company's IT staff) and is effectively dependant upon the NAS device implemented at the network (company) site.

One of the intriguing features of key 26 is that it provides a client with a configuration that embeds encryption at all possible layers with AES at Layer 2, IPSec and PPTP at Layer 3, SSH at Layers 4-5 and SSL at Layers 6-7 all on one key. SSL creates a tunnel at the OSI layer 7 (which only offers security for WEB application). This means that users don't have access to network resources such as file sharing, printers or centralized storage. IPSec and PPTP creates a tunnel at layer 3 which allows access to network resources and all other applications.

The system provides Two-Factor secure authentication for the creation of a VPN tunnel. Further user authentication can take place on the networks NAS through an authentication server to access network resources. Active Directory, LDAP (i.e Lightweight Directory Access Protocol, which is an Internet protocol that email and other programs use to look up information from a server) and RADIUS (Remote Authentication Dial In User Service (RADIUS) is an authentication authorization and accounting protocol for applications such as network access or IP mobility. It is intended to work in both local and roaming situations), and even the proposed Diameter protocol (planned replacement for radius protocol) authentication standards can be utilized, for example.

As noted above, the system uses mutual authentication so both ends of the communication are validated and a secure tunnel technique that provides a means by which data can be transferred from one location to another without risk of interception or tampering, hindering a man in the middle type attack. A man in the middle attack (MITM) is an attack in which an attacker is able to read, insert and modify at will, messages between two parties without either party knowing that the link between them has been compromised.

The present invention is a solution that provides secure access to not only remote users but to local, wireless and guests. The key 26 does not require the end user to install any software or substantial drivers making it very easy and cost effective to deploy. The current software deployment on the key is minimal and the associated overhead is effectively unnoticeable to the end user via this approach. The system works seamlessly with remote desktop application protocols.

Although the present invention has been described with particularity herein, the scope of the present invention is not limited to the specific embodiment disclosed. It will be apparent to those of ordinary skill in the art that various modifications may be made to the present invention without departing from the spirit and scope thereof.

What is claimed is:

1. Secure electronic device networks comprising:

A plurality of independent networks; , wherein each independent network has a network host and a plurality of end user devices attachable to the network forming nodes thereof, wherein each end user device has input plugs for coupling accessories thereto and each network host includes a private network host credential unique for each network host ;

A network managing system which is configured for authenticating the end user devices attached to one independent network;

A plurality of authenticating keys, with each key attachable to an input plug of an end user device, each key containing at least three authenticating credentials therein for each independent network, wherein the three authentication credentials for each independent network include
  i) a first credential in the form of a global identifier including a certificate having selected end user information, wherein the global identifier is common for each network,
  ii) a second credential in the form of a private credential identifying an individual end user which is generated by the network host of the associated network following receipt of the first credential, and
  iii) a third credential in the form of a connection profile generated by the associated network,
whereby the authenticating is accomplished through the network managing system's confirmation of the presence of the four credentials including the private network host credential from the network host and the three authentication credentials on the key when the key is coupled to the end user device, and wherein this presence of the four credentials is validated prior to granting access to the independent network.

2. The secure electronic device networks as claimed in claim 1 wherein each key attaches to a universal serial bus port of the end user device.

3. The secure electronic device networks as claimed in claim 2 wherein the network managing system utilizes at least one additional network access validating tool which is distinct from the authenticating keys for access to the networks.

4. The secure electronic device networks as claimed in claim 3 wherein the network managing system utilizes at least one of a user inputted Personal Identification Number and a user inputted password.

5. The secure electronic device networks as claimed in claim 1 wherein each key includes password management software thereon.

6. The secure electronic device networks as claimed in claim 1 wherein each key further includes network protection software.

7. The secure electronic device networks as claimed in claim 1 wherein at least one independent network is a Wi-Fi network.

8. A method of network management comprising the steps of:
  Providing a plurality of independent networks, wherein each independent network has a network host and a plurality of end user devices selectively attachable to the independent network forming nodes thereof, wherein each end user device has input plugs for coupling accessories thereto and each network host includes a private network host credential unique for each network host;
  Providing a plurality of authenticating keys, with each key attachable to an input plug of an end user device, each key containing at least three authenticating credentials for each independent network therein, wherein the three authentication credentials for each independent network include
    i) a first credential in the form of a global identifier including a certificate having selected user information, wherein the global identifier is common for each network,
    ii) a second credential in the form of a private credential identifying an individual end user which is generated by the network host of the associated network following receipt of the first credential, and
    iii) a third credential in the form of a connection profile generated by the associated network;
  Attaching one authenticating key to an input plug of one end user device;
  Coupling the end user device to one independent network;
  authenticating the access of the end user device to the individual network through the confirmation of the presence of the four credentials including the private credential from the network host and the three authentication credentials on the key when the key is coupled to the end user device, wherein each key includes password management software thereon, and wherein each key further includes network protection software.

9. An authenticating key for access of an end users electronic device to a plurality of independent networks and authenticated by a network management system, the authenticating key comprising a key attachment mechanism which is attachable to an input plug of an end user device, wherein the key is configured to create a communication link between the network management system and the key, each key further containing three authentication credentials for each independent network, wherein the three authentication credentials for each independent network include
  i) a first credential in the form of a global identifier including a certificate having selected user information, wherein the global identifier is common for each network,
  ii) a second credential in the form of a private credential identifying an individual end user which is generated by a network host of the associated network following receipt of the first credential, and
  iii) a third credential in the form of a connection profile generated by the associated network, wherein the authenticating key is configured to provide the network management system with confirmation of the presence of the credentials using the communication link.

10. The authenticating key as claimed in claim 9 wherein the key further includes network protection software.

11. The authenticating key as claimed in claim 10 wherein the key includes password management software.

12. The authenticating key claimed in claim 11 wherein the key attaches to a universal serial bus port of the end user device.

13. The authenticating key as claimed in claim 12 wherein the key is a USB port flash drive.

14. The authenticating key as claimed in claim 11 wherein the key is a flash drive.

15. The authenticating key claimed in claim 9 wherein the key attaches to a universal serial bus port of the end user device.

16. The authenticating key as claimed in claim 15 wherein the key is a USB port flash drive.

17. The authenticating key as claimed in claim 16 wherein key includes password management software.

* * * * *